United States Patent
Nam Koong et al.

(10) Patent No.: US 7,640,246 B2
(45) Date of Patent: Dec. 29, 2009

(54) METHOD AND SYSTEM FOR PROVIDING CONTENT

(75) Inventors: Whon Nam Koong, Seoul (KR); Yoo-Shim Hur, Seoul (KR)

(73) Assignee: NHN Corporation, Seoul (KR)

(*) Notice: Subject to any disclaimer, the term of this patent is extended or adjusted under 35 U.S.C. 154(b) by 302 days.

(21) Appl. No.: 11/103,390

(22) Filed: Apr. 11, 2005

(65) Prior Publication Data

US 2005/0256880 A1 Nov. 17, 2005

Related U.S. Application Data

(63) Continuation of application No. PCT/KR02/02178, filed on Nov. 21, 2002.

(30) Foreign Application Priority Data

Oct. 10, 2002 (KR) .................. 10-2002-0061725

(51) Int. Cl.
*G06F 17/30* (2006.01)
(52) U.S. Cl. .................. 707/10; 709/201; 709/223
(58) Field of Classification Search .................. None
See application file for complete search history.

(56) References Cited

U.S. PATENT DOCUMENTS

| | | | | |
|---|---|---|---|---|
| 5,349,448 A | * | 9/1994 | Hirai | ............................ 358/444 |
| 5,629,948 A | * | 5/1997 | Hagiwara et al. | ............ 714/748 |
| 5,903,669 A | * | 5/1999 | Hirabayashi | ................. 382/232 |
| 6,377,972 B1 | * | 4/2002 | Guo et al. | .................... 709/201 |
| 6,385,636 B1 | * | 5/2002 | Suzuki | ....................... 709/223 |
| 6,708,213 B1 | * | 3/2004 | Bommaiah et al. | ........... 709/226 |
| 2001/0018713 A1 | * | 8/2001 | Kokado et al. | .............. 709/235 |
| 2002/0114341 A1 | * | 8/2002 | Sutherland et al. | .......... 370/428 |
| 2003/0087629 A1 | * | 5/2003 | Juitt et al. | .................... 455/411 |
| 2004/0268344 A1 | * | 12/2004 | Obilisetty | .................... 717/175 |

FOREIGN PATENT DOCUMENTS

| | | |
|---|---|---|
| KR | 2001-0068478 | 7/2001 |
| KR | 2003-0014094 | 2/2003 |

* cited by examiner

*Primary Examiner*—Hosain T Alam
*Assistant Examiner*—Jieying Tang
(74) *Attorney, Agent, or Firm*—Knobbe Martens Olson & Bear LLP

(57) ABSTRACT

A method and a system for providing content are disclosed where a plurality of user clients coupled by a mesh structure transmit large-size multimedia data at a high speed. A user client receives content data from other user clients or a content server. Even if many users request content, the load of a server does not increase because the content server and the user clients provide content together. A user client requests content data from a plurality of nodes and receive content data by way of a parallel/distribution method for a stable data receipt.

25 Claims, 15 Drawing Sheets

METHOD AND SYSTEM FOR PROVIDING CONTENT

RELATED APPLICATIONS

This application is a continuation application, and claims the benefit under 35 U.S.C. §§ 120 and 365 of PCT Application No. PCT/KR2002/002178, filed on Nov. 21, 2002 and published on Apr. 22, 2004, in English, which is hereby incorporated by reference.

BACKGROUND OF THE INVENTION

1. Field of the Invention

The present invention relates to a method and a system for providing content, more particularly to a method and a system for transmitting large size content such as movie and animation through a network at a higher speed.

2. Description of the Related Technology

The Internet was used for sharing or providing information in the beginning of the Internet. However, nowadays, use of the Internet is increasing rapidly, and business field of the Internet is getting wider such as content provision, electronic commerce and advertisement, etc. Therefore, on-line business became as important as off-line business.

Conventionally, most content data provided through the Internet were small size data such as document or picture. However, as data transmission technology and devices develop, multimedia content is also widely provided.

FIG. 1A is a conventional content transmission system. As shown in FIG. 1A, in a conventional content transmission system, all user clients are coupled to a content server, and content is transmitted from one content server.

In the system of FIG. 1A, as the bandwidth of the content server is limited, content data cannot be transmitted to many user clients at the same time. Further, there may occur data loss, if transmission path between the user client and the content server is complex. Therefore, the transmission system of FIG. 1A is not appropriate for transmitting high speed data.

In order to solve above the problems, a method for minimizing data loss was developed, which locates proxy server, cache server, load balancing server, etc. between the content server and the user client. However, the above method still failed to solve the problem of server load which results in transmission failure.

FIG. 1B is another conventional content transmission system. The system of FIG. 1B includes a plurality of multicast routers along with a content server.

In the system of FIG. 1B, the content server provides content to the plurality of multicast routers, and the multicast routers provide content provided from the server to users. As users receive content from the multicast router or the server, the load of the server can be reduced.

However, the system of FIG. 1B can be applied only to the real time Internet broad casting and cannot be applied to VOD (Video On Demand) where different content is requested.

Further, installing of multicast routers requires too much expense and general routers should be substituted with multicast routers in the existing network.

FIG. 1C is a conventional system configuration of CDN (Content Delivery Network). In CDN, edge servers are installed and the edge server provides content to near users.

According to CDN system, as a plurality of distributed edge servers transmit content to users, the load of server can be reduced unlike the system of FIG. 1A where one server transmits content. However, as CDN system requires a plurality of edge servers, the CDN system requires much expense and content cannot be provided in a wide area.

Further, as the number of users increases, the load of distributed edge servers can also occur, and therefore, fundamental problem of server load cannot be solved in the CDN system.

SUMMARY OF CERTAIN INVENTIVE ASPECTS

One aspect of the present invention provides a method and a system which can effectively transmit content without load of a server even when many users request content.

Another aspect of the present invention provides a method and a system where the more users request content, the faster the content can be provided.

Another aspect of the present invention provides a method and a system which provides content through communication between user clients coupled in mesh structure.

Another aspect of the present invention provides a method and system which can receive content more stably by receiving content by way of a parallel/distribution method.

Another aspect of the invention provides a method for proving content in a system where a content server and a plurality of user clients are coupled through network, each of the user clients having communication agent for communicating with the content server or other user clients, comprising: (a) receiving content information that each of the user clients stores; (b) receiving content request signal from a user clients; and (c) providing information of nodes having the requested content using the information received in said (a) to the user client that requested content, wherein, the communication agent controls the user client to establish connections with plurality of nodes using the node information and to receive the requested content by way of a parallel/distribution method from nodes where connection is established.

In one embodiment, the method further comprises providing information for playing content including meta information to the user client.

The content data may comprise a plurality of blocks which are divided from the content data by predetermined size and the block may comprise a plurality of sub blocks which are divided from the block by predetermined size.

The communication agent may comprise an agent manager module for providing content information stored in the user client and a user client identification number and transmitting content request information to the content server when user requests content; a cache manager module for managing content information stored in the user client; a mesh manager module for establishing connection with nodes having the requested content and receiving the content by parallel/distribution method; and a player manager module for providing content request information to the agent manager module and providing received content to a content player.

The mesh manager module may comprise a node manager module for receiving information of nodes having requested content from the content server; a connection control module for establishing connection with predetermined number of nodes among nodes included in the node information and receiving different sub blocks from the nodes where connection is established; a sub block manager module for determining whether all sub blocks included in a block are received; a block manager module for providing block data to the player manager module when all sub blocks included in a block are received.

The connection control module may comprise a module for determining whether a node where sub block transmission is completed, when sub block data receipt error occurs in some nodes among nodes where connection is established; a module for requesting the sub block with receipt error to the node where sub block transmission is completed if the node where sub block transmission is completed exists; a module for establishing connection with new nodes using the information of nodes in (b) to receive sub block data with receipt error when any node where sub block receipt is completed does not exists among nodes where connection is established.

The sub block data may include header information including a resource identifier of requested content, a block number and a sub block number.

In one embodiment, the method may further comprise receiving content reservation request information from the user client; and providing information of nodes where requested reservation content are stored to the user client The providing information for playing content may comprise receiving an authentication request signal from the user client; transmitting response signal for authentication request to the user client; receiving meta data request signal from the user client, if the user is authorized; and transmitting the requested meta data to the user client.

The communication agent may further comprise a reservation manager module for transmitting reservation request information and managing reserved content information.

DETAILED DESCRIPTION OF CERTAIN INVENTIVE EMBODIMENTS

Figure 1A:
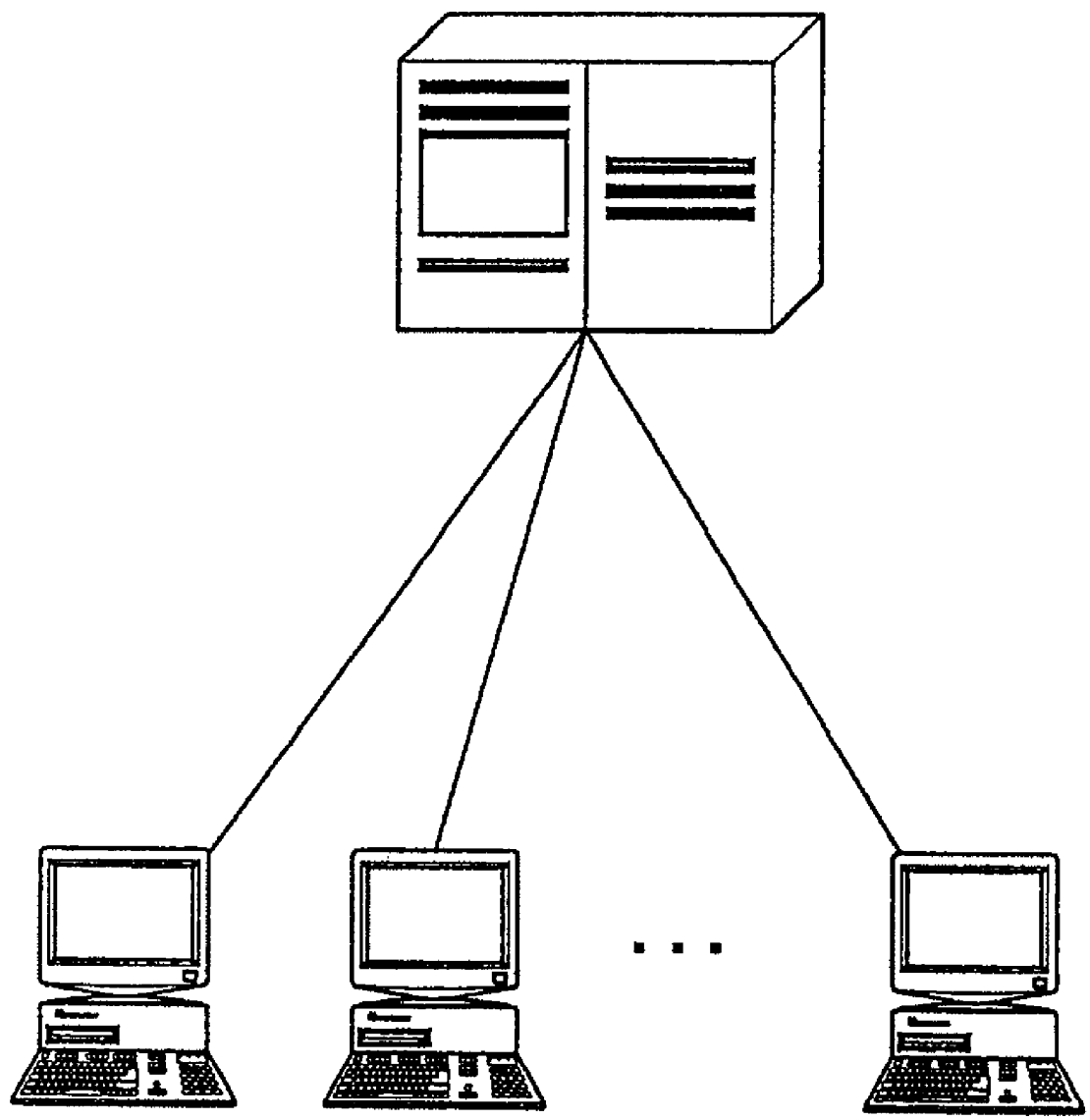
FIG. 1A is a conventional content transmission system.
Figure 1B:
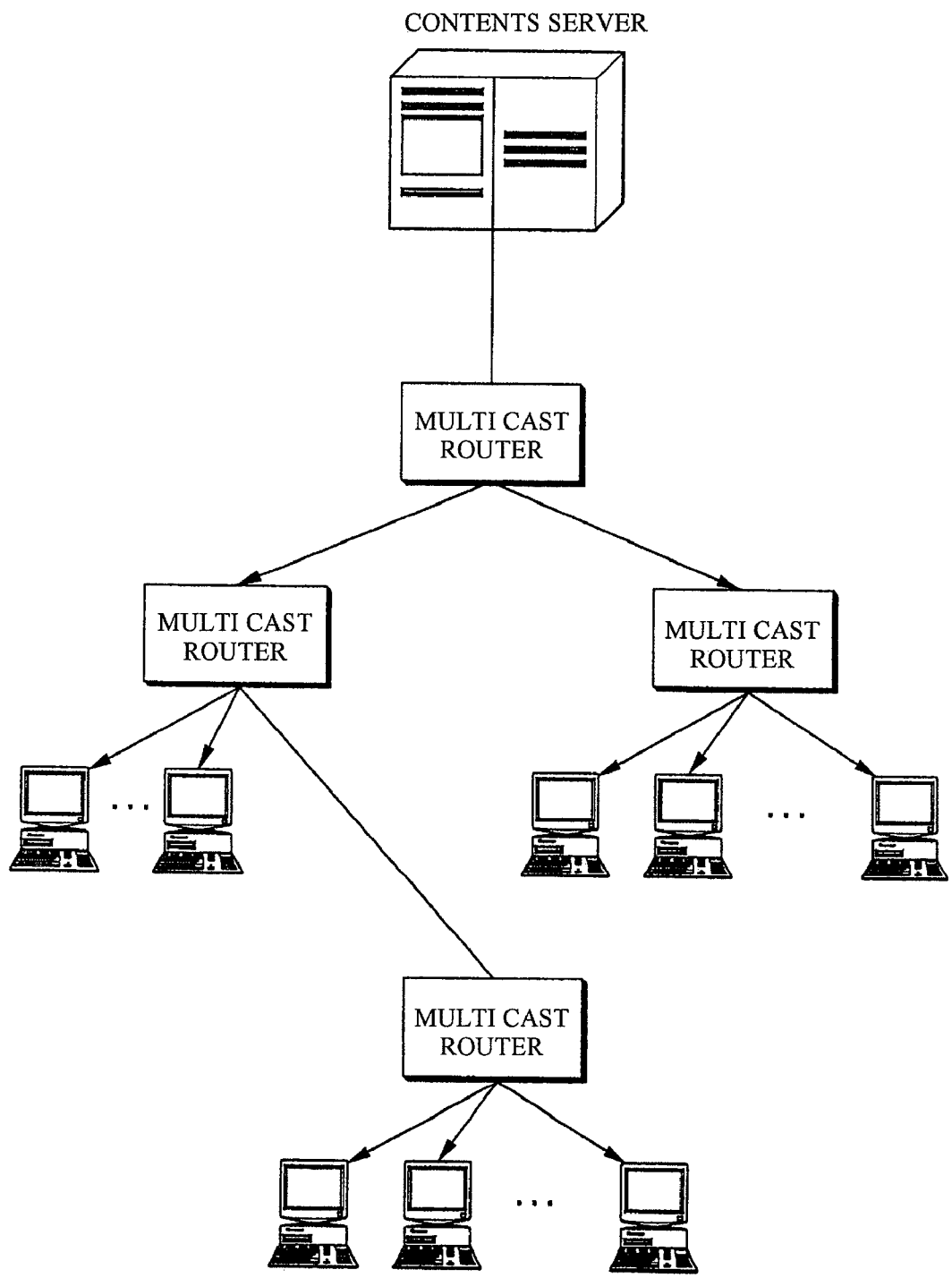
FIG. 1B is another conventional content transmission system.
Figure 1C:
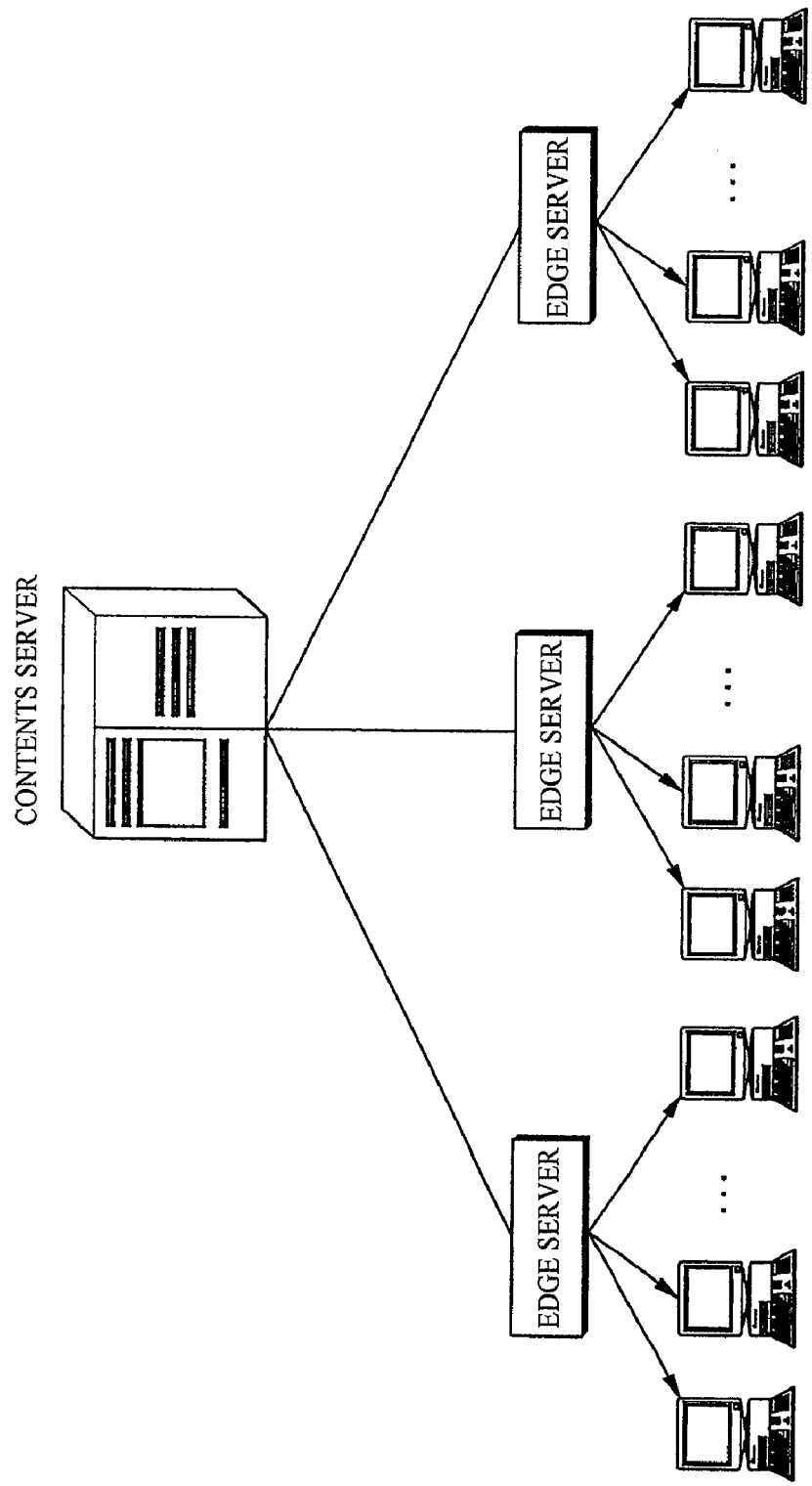
FIG. 1C is a conventional system configuration of CDN (Content Delivery Network).
Figure 2:
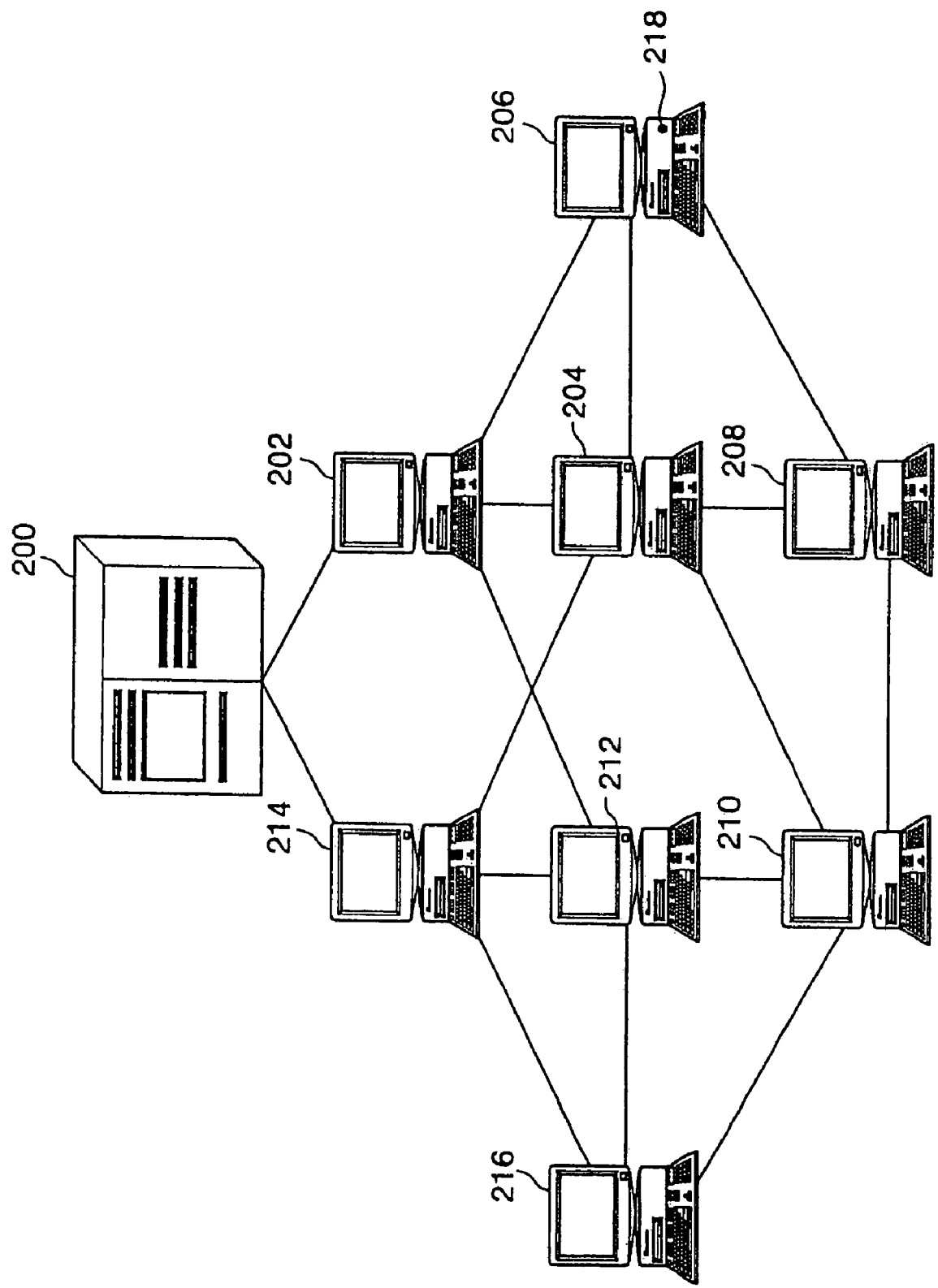
FIG. 2 is a network configuration of a content delivery system according to one embodiment of the present invention.

FIG. 2 is a network configuration of content delivery system according to one embodiment of the present invention.

Referring to FIG. 2, in one embodiment, the content delivery system may comprise a content server 200, a plurality of user clients 202~216 coupled to the content server 200 by mesh structure, and a communication agent is installed on the user clients 202~216.

The case where the content are in the form of moving pictures such as movie and animation will be explained in this embodiment. However, it would be apparent to those skilled in the art that other content data besides data in the form of moving pictures may be employed.

According to one embodiment of the present invention, content data are transmitted to a user client by overlay multicast. Therefore, when a user requests content data, the requested content data may be transmitted from the content server 200 to user client, and otherwise, the requested content data may also be transmitted from other clients having the requested content data to the user client.

The content server 200 provides content requested by the user clients, and provides information of user clients having the requested content data so that the user client that has requested the content data can receive the data from other user clients.

For example, when a user 204 among users 202~216 in FIG. 2 requests content data, the content server 200 provides requested content to the user 204 directly or the content server 200 provides information of other clients that store the requested content data.

The communication agent 218 is a computer program which is installed in each of user clients in order to transmit and receive content data. In the following embodiments, the communication agent is computer software, however it would be apparent to those skilled in the art that separate a device or a card may also be employed as the communication agent.

Users can download the communication agent from the content server 200 or other servers of the Internet and install the communication agent.

When the information of the user clients 206, 208, 210, 212 that have requested content data is transmitted to the user client 204, the communication agent installed in the user client 204 requests the content to all or some of the user clients 206, 208, 210, 212.

According to one embodiment of the present invention, the user client 204 that has requested the content data receives the content data by parallel/distribution method. That is, the user client 204 that has requested the content data does not receive the content data from only one of user clients 296, 208, 210, 212 but from a plurality of the user clients. For example, the user client 204 may receive the content data from some user clients 206, 210, 212 having the requested content data. The user client 204 which has received the content data also stores the received data so that stored content data can be transmitted to other user clients.

According to one embodiment of the present invention, content data are received maintaining connection with a plurality of user clients, because there may occur a receipt error when the power of the user client which provides content data is off or connection with the user client becomes instable. The method for receiving content data by parallel/distribution method will be explained in more detail by referring to another figure.

In the system of FIG. 2, the load of the content server 200 is not high although many user clients requests data because the content data are transmitted from the content server 200 or user clients that have the requested content data. Especially, in the case of real time broadcasting, when the more users request content, the faster the content can be transmitted because all of the user clients request same content.

Figure 3:
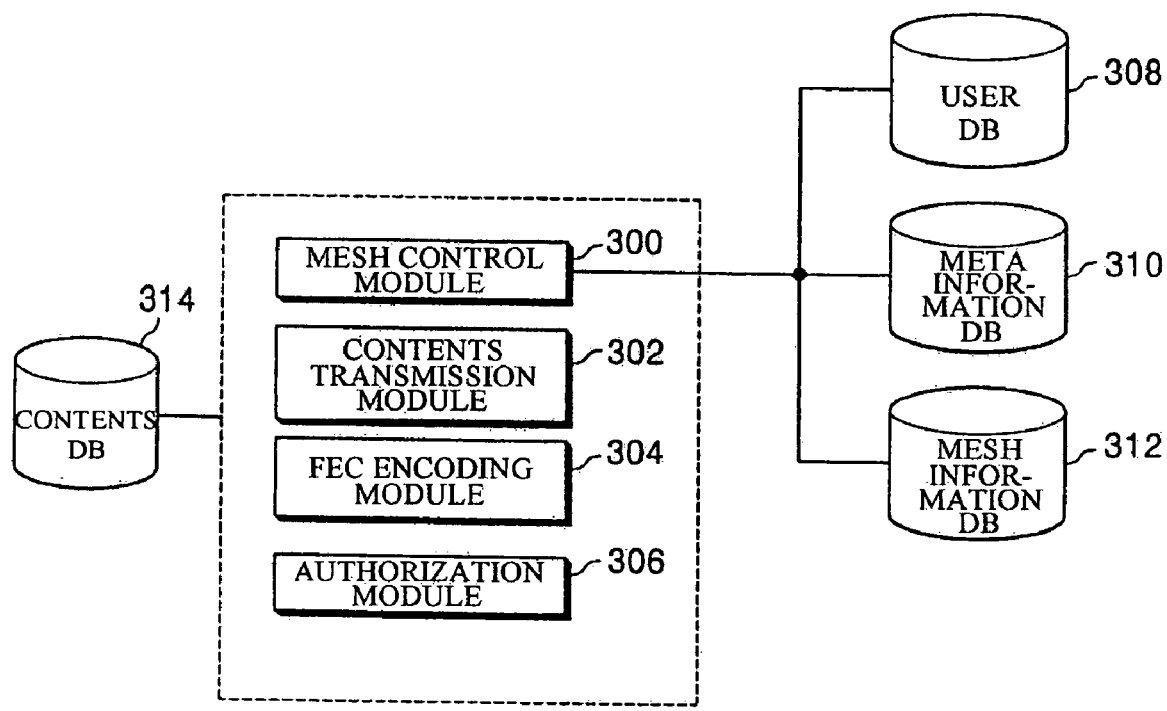
FIG. 3 is a block diagram of the content server and databases coupled to the content server according to one embodiment of the present invention.

FIG. 3 is a block diagram of the content server and databases coupled to the content server according to one embodiment of the present invention.

As shown in FIG. 3, the content server 200 according to one embodiment of the present invention may comprise a mesh control module 300, a content transmission module 302, an FEC encoding module 304 and an authentication module 306 and a user database 308, a meta information database 310, a mesh information database 312 and a content database 314 may be coupled to the content server 200. It would be apparent to those skilled in the art that databases can be included in the content server unlike FIG. 3.

In FIG. 3, the mesh control module 300 manages information on user clients which are coupled to the content server 200 through the communication agent 218. When the power of a user client where the communication agent is installed is ON, the user client transmits information on content stored in the user clients and the mesh control module stores the received information in the mesh information database 312.

Furthermore, when a user requests specific content data, the mesh control module 300 derives information on user clients which have the requested content data from the mesh information database 312 and transmits the derived information to the user client which has requested the content data.

The content transmission module 302 transmits the content data to the user clients that have requested content. The content transmission module 302 derives the requested content data from the content database 314.

FEC encoding module 304 performs FEC encoding on the content data and provides the encoded content data to the content transmission module 302. As the FEC encoding is conventional technology, the detailed method of FEC encoding will not be explained here. In one embodiment, the FEC encoding module 304 is not an essential element. The FEC encoding module 304 may be employed or not be employed depending on the effectiveness of transmission. When FEC encoding module 304 is employed, the requested content stored in the content database is encoded by the FEC encoding module 304, and encoded content is provided to the content transmission module. When the FEC encoding module 304 is not employed, the content data of the content database are directly provided to the content transmission module.

If the FEC encoding is performed, it is easy to correct error in parallel/distribution transmission, however, the load of CPU becomes higher for FEC encoding and decoding.

Format of the content data and transmission method will be explained in more detail by referring to another figure.

The authentication module 306 performs authentication of users and processes billing information. When a user requests content, authentication key information including user ID and password is transmitted to the content server 200, and the authentication module 306 determines if the user is a registered user through the communication with the mesh control module. Further, the authentication module 306 determines if the user who has requested content has paid for the content in connection with an external billing server (not shown).

IDs of users, passwords and personal information are stored in the user database 308, and content data are stored in the content database 310.

Information on coding method of content, author, etc. is stored in the meta information database 310. If a user is authenticated, the mesh control module 300 provides meta information of requested content data. In one embodiment, the meta information is essential information in playing moving picture content, and the content data file cannot be played without meta information.

Information on user clients that are coupled to the content server 200 and content stored in the user clients coupled to the content server 200 is stored in the mesh information database 312. If real time broadcasting data are provided to a user, the information that the user is receiving real time broadcasting data is also stored in the mesh information database 312.

Figure 4:
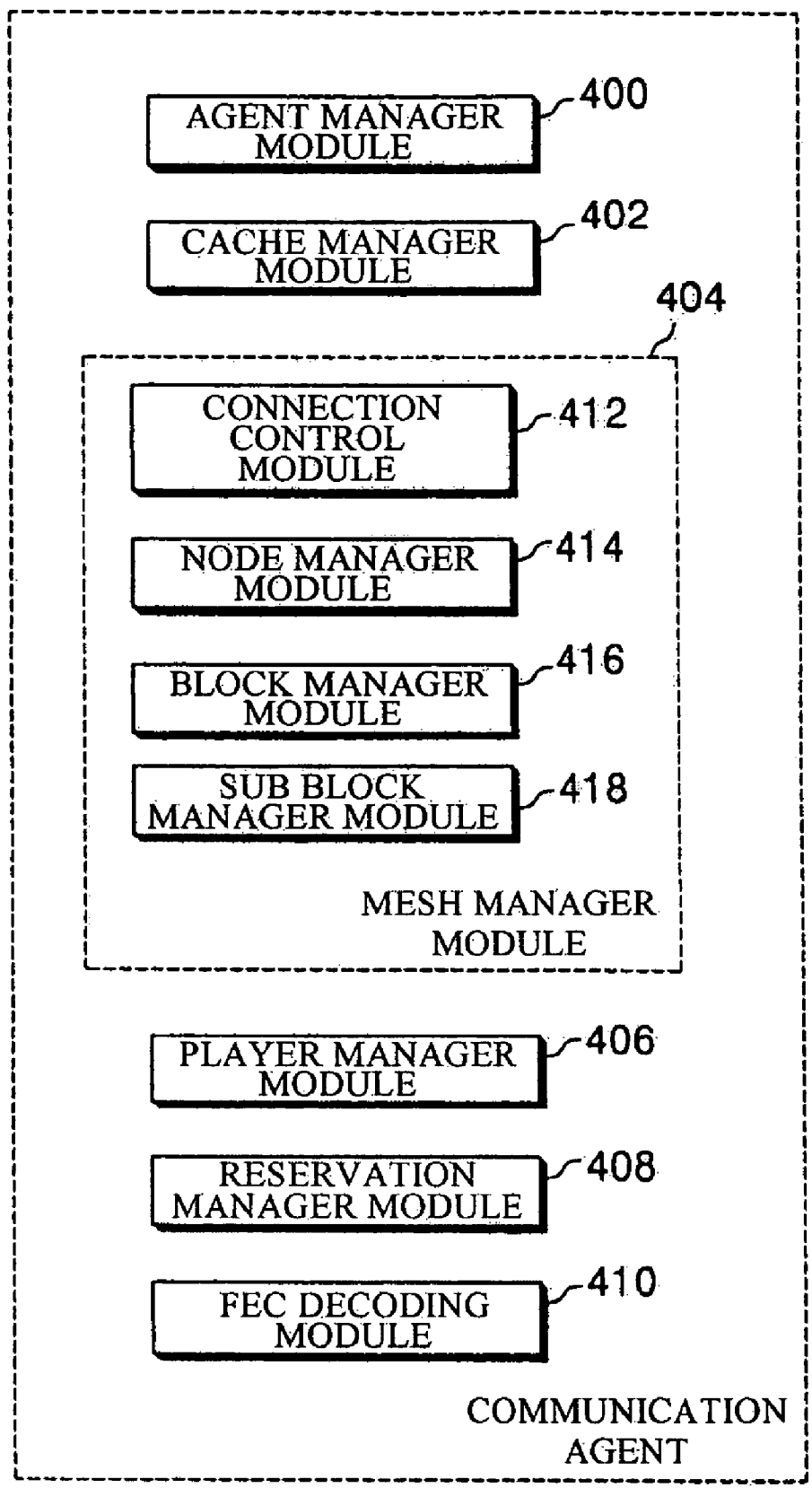
FIG. 4 is a block diagram of a communication agent according to one embodiment of the present invention.

FIG. 4 is a block diagram of a communication agent according to one embodiment of the present invention.

As shown in FIG. 4, the communication agent according to one embodiment of the present invention may comprise an agent manager module 400, a cache manager module 402, mesh manager module 404, a player manager module 406, a reservation manager module 408 and an FEC decoding module 410, and the mesh manager module 412 may comprise a connection control module 412, a node manager module 414, a block manager module 416 and a sub block manager module 418.

In FIG. 4, the agent manager module 400 performs communication with the mesh control module 300 of the content server. When a user client is ON or the communication agent is executed, the agent manager module 400 provides information of a client address including IP and port number, and content information stored in the user client to the mesh control module 300.

Further, when a user requests content data, the agent manager module 400 transmits content request information to the mesh control module of the content server and provides meta information to a player where content data is executed after downloading the meta information from the content server.

The cache manager module 402 manages content data received form the content server or from other clients. The cache manager module 402 manages information on remained capacity of cache, and stored content data and provides the information to the agent manager module 400 when a user client is on or the communication agent is executed. Further, the cache manager module 402 provides stored content data when content data are played.

The mesh manager module 404 receives content data by parallel/distribution method by requesting content data to the content server or other user clients where requested content data are stored.

The connection control module 412 of the mesh manager module 404 establishes connection between the user client which requests content data and the content server or other user clients (hereinafter referred to as "node") having the requested content data. As mentioned above, node information is provided to the user client which requests content data from the mesh control module 300 which derives information form the mesh information database 312.

In order to receive data by parallel/distribution method, the connection control module 412 requests data to a plurality of nodes. At this time, the connection control module 412 requests different data for each of the nodes and receives data from a plurality of paths.

Figure 6:
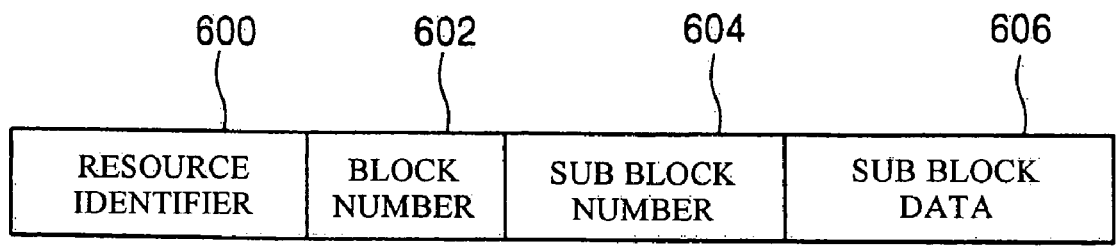
FIG. 6 is a format of content data transmitted between nodes and the user client which requested content data.

FIG. 6 is a format of content data transmitted between nodes and the user client which requested content data.

As shown in FIG. 6, the content data according to one embodiment of the present invention may include resource identifier 600, block number 602, sub block number and sub block data 606.

According to one embodiment of the present invention, for distributed transmission of content data, the content data comprise blocks and a block comprises sub blocks. In other words, the total content data comprise a plurality of blocks and the block data comprise a plurality of sub blocks. The content data are transmitted by sub block units.

In FIG. 6, the resource identifier 600 is an identification number for identifying content data. For example, when content are in the form of movie, information for identifying the requested movie is written in resource identifier 600.

The block number 602 is header information which represents the sequence number of block among all blocks of content data.

The sub block number 604 is header information which represents the sequence number of the sub block included in a block.

Figure 5:
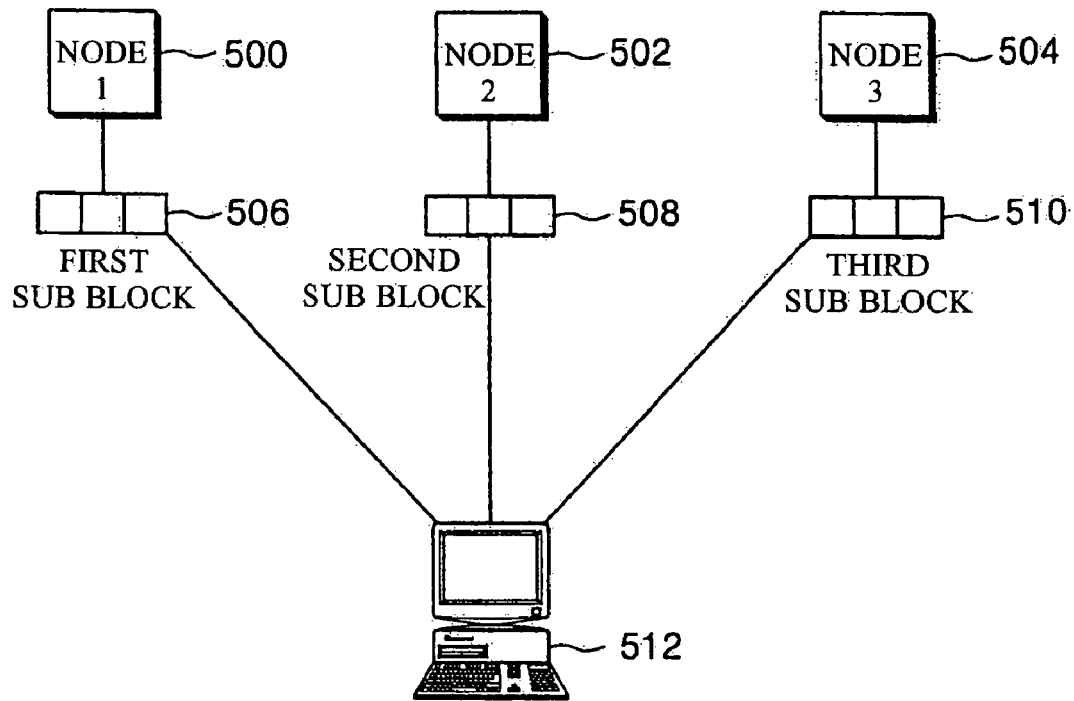
FIG. 5 illustrates a method for receiving content data by way of a parallel/distribution method in the connection control module.

FIG. 5 illustrates a method for receiving content data by parallel/distribution method in the connection control module.

As shown in FIG. 5, a user client requests sub block data to a plurality of nodes 500 502 504, and sub block data that are requested to each of the nodes are different. In FIG. 4, three sub blocks are received from three nodes at the same time. However, it would be apparent to those skilled in the art that the number of nodes to which a user client requests data and the number of sub block can change depending on the given situation.

Further, if transmission speed of a node is faster than other nodes, more sub block data can be requested to the node. For example, if a transmission speed of node 1 500 is faster than other nodes 502, 504, other sub blocks in addition to the first sub block 506 may be requested to the node 1 500.

When parallel/distribution method is employed as shown in FIG. 5, there may occur a receipt error if connection with a node is disconnected. The algorithm of connection control module for solving this problem will be explained in more detail referring to another figure.

The node manager module 414 provides node information provided from the mesh control module 300 of the content server 200. The node information includes IP address and port number of node and content information which the node stores. When a user requests content, the agent manager module 400 requests information of nodes that store the requested content to mesh control module of the content server 300 and receives the node information and provides the received information to the node manager module 414. The node information is updated because power of node storing the content may be off or connection state may be instable.

The block manager module 416 provides block data of content to a content player. When the player manager module requests a specific block, the block manager module requests the block to cache manager module 402. If the requested block is stored in cache, the block manager module 416 provides the stored block to the player manager module 408. If the requested block is not stored in cache, the block manager module 416 requests the connection control module 412 to receive the requested block.

The sub block manager module 418 receives sub block from nodes and determines if all the sub blocks included in a block have been received. If all the sub blocks included in a block are received, the sub block manager module 418 provides the block data to the cache manager module 402 or the block manager module 416.

When a user requests content by executing a content player, the player manager module 406 provides requested content information to the agent manager module 400 and receives the block data of requested content and provides the received data to the content player.

The reservation manager module 408 reserves content to be received in advance. In one embodiment, the reservation manager module 408 is not an essential element, however the reservation manager module 408 is useful when the network condition of a user cannot support the content transmission speed.

According to one embodiment of the present invention, transmission of content data is performed by a server or user clients, and therefore, the content data can be transmitted at high speed even if bandwidth is limited. For example, content data can be transmitted at 2 Mbps. However, in some cases, Internet network condition cannot support this high speed. Therefore, in this case, the reservation manager module 408 reserves content data before playing the content and stores the content data in cache in advance.

The reservation manager module 408 manages information on content which a user has requested to reserve and receipt state for the reserved content. The reservation manager module 408 requests required data through the connection control module 412 until all the reserved content data have been received.

The FEC decoding module 410 decodes FEC encoded data when the received content data from content server or nodes are FEC encoded. As mentioned above, in one embodiment, the FEC encoding and decoding module are not essential elements.

Figure 7:
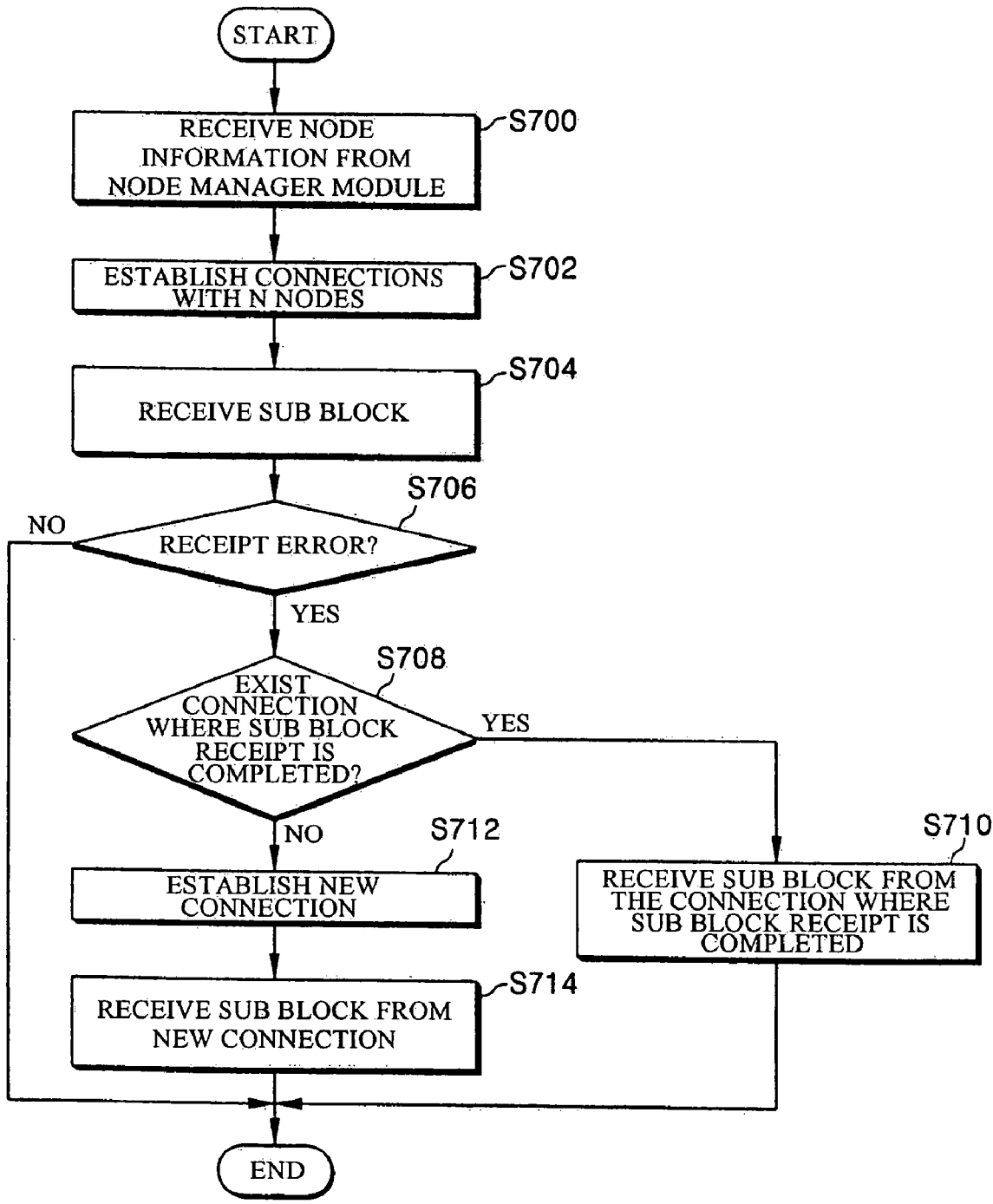
FIG. 7 is a flowchart illustrating a process where the connection control module of the communication agent controls data receipt by way of a parallel/distribution method.

FIG. 7 is a flowchart illustrating a process where the connection control module of the communication agent controls data receipt by parallel/distribution method.

As shown in FIG. 7, the connection control module 412 receives information on node which stores the requested content from the node manager module S700.

After receiving node information, the connection control module 412 establishes connections with predetermined number (N) of nodes among nodes included in the node information. In step S700, the number of nodes included in the node information may be more than N, and the connection control module 412 selects some nodes. The communication between communication agents for establishing connection can be performed by the agent manager module 400 or the connection control module 412. The detailed communication process for establishing connection will be explained in more detailed referring to another figure.

If the connections with a plurality of nodes are established, the connection control module 412 requests the sub block of requested content to each of the nodes and receives the sub block S704. As mentioned above, the connection control module requests different sub blocks to each of the nodes.

The sub block manager module 416 determines if all the sub blocks included in a block have been received S706.

Among N connections, if a sub block receipt error occurs in at least one connection, the connection control module determines if there is any connection where sub block receipt is completed among other connections where receipt error has not occurred S708.

If a connection where sub block receipt is completed exists, the connection control module requests the sub block with receipt error through the connection where sub block receipt is completed. If the sub block receipt in a connection is completed earlier than other connections, it can be determined that the state of the connection is good. Therefore, the connection control module receives sub block with receipt error from the connection where sub block receipt is completed.

If a connection where sub block receipt is completed does not exist among connections where no sub block receipt error has not occurred, the connection control module establishes connection with new node using the node information received in step S700 S712.

If the connection establishment is completed with new node, sub block data with receipt error are received through new connection S714.

Figure 8:
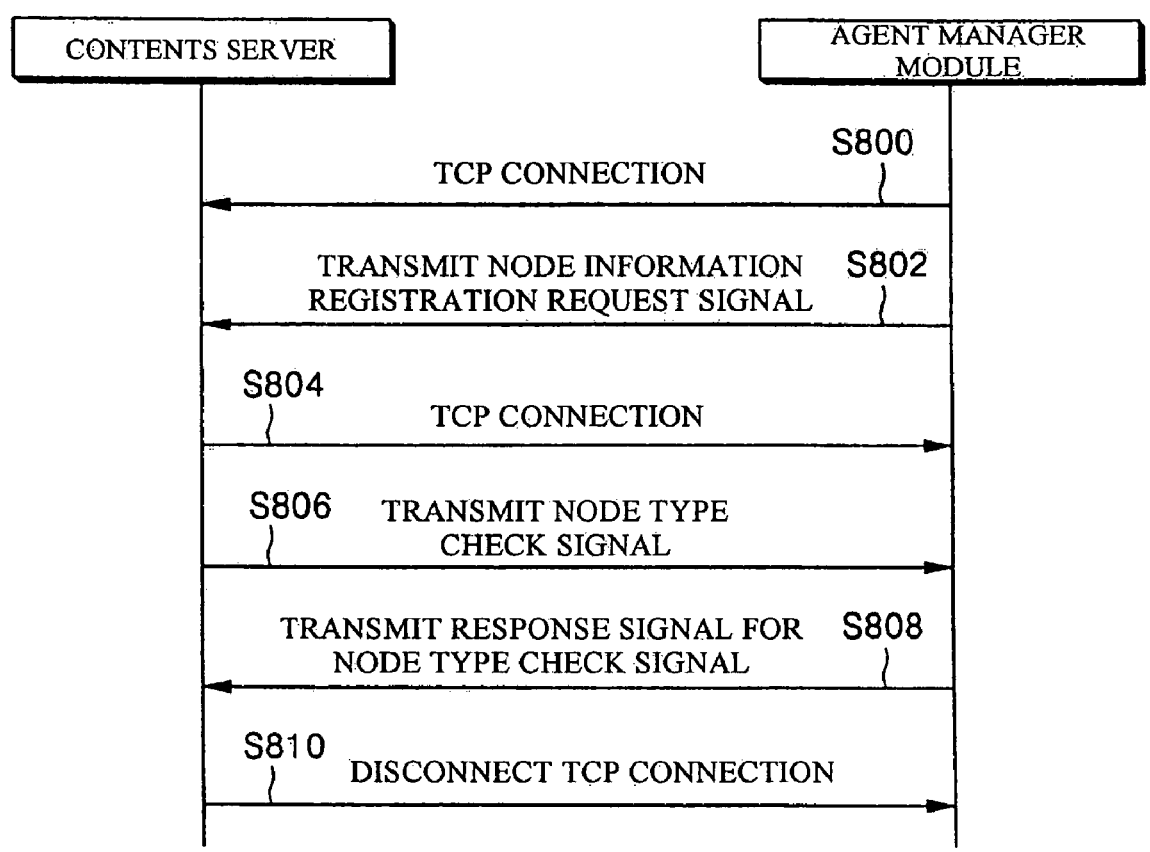
FIG. 8 is a flowchart for illustrating process that the communication agent registers a user client when power of the user client is on according to one embodiment of the present invention.

FIG. 8 is a flowchart for illustrating process that the communication agent registers a user client when power of the user client is on according to one embodiment of the present invention.

As shown in FIG. 8, when the power of a user client is on, the agent manager module 400 of the communication agent performs TCP connection with the content server 200 S800.

After TCP connection with the content server 200 is performed, the agent manager module of the communication agent transmits node information registration request message to the content server 200 S802.

The node information registration request message includes IP address, port number and cache information of the user client, the cache information includes content identification number of content stored in the cache.

The mesh control module of the content server stores IP address, port number and cache information of the user client in the mesh information database after receiving node information registration message.

Therefore, when power of a user client is on, the content server 200 can detect the IP of the user client and content information of the user client.

After receiving the node information registration request message, the content server 200 performs TCP connection with the user client S804.

After TCP connection is performed, the content server transmits node type check signal to the user client S806. The node type check signal includes node identification number, the user client which received the node type check signal transmits response signal for the node type check signal to the content server S808.

The content server determines that node registration process is completed if the response signal of the node type check signal is transmitted and disconnects the TCP connection.

Figure 9:
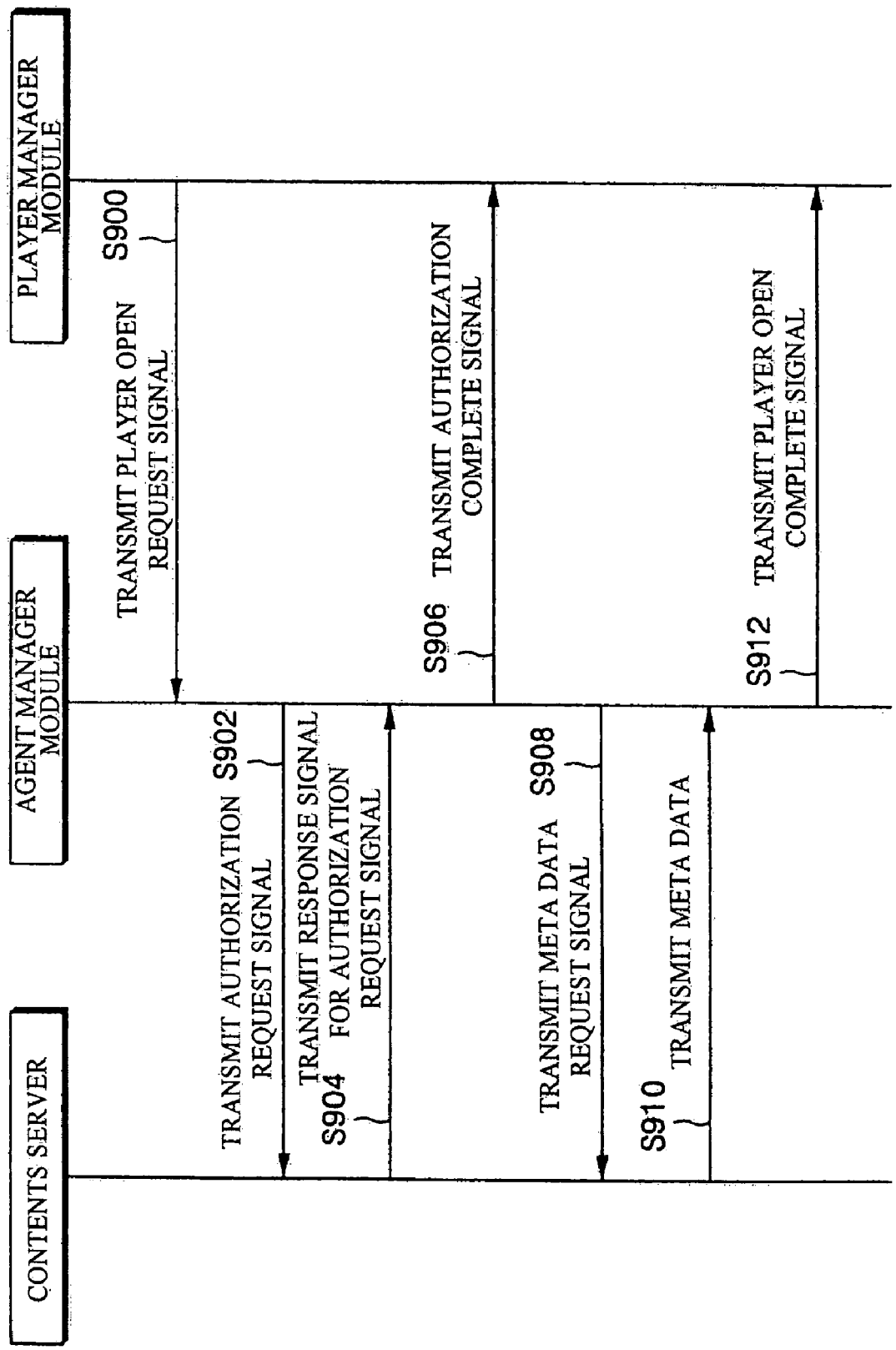
FIG. 9 is a flowchart for illustrating communication process of player manager module, agent manager module and content server when a user requested content by executing a player.

FIG. 9 is a flowchart for illustrating communication process of player manager module, agent manager module and content server when a user requested content by executing a player.

When a user requests content, the player manager module 306 sends player open request signal to the agent manager module 400 S900. The player open request signal includes content identification information, user ID and authentication key information.

After receiving player open request signal, the agent manager module 400 transmits authentication request signal to the content server. The authentication request signal includes user ID and authentication key information.

After receiving the authentication request signal, the authentication module of the content server 200 determines whether the user paid for the content through the user ID and authentication key information and transmits authentication response signal to the agent manager module S904.

When the authentication succeeds, the agent manger module 400 notifies the player manager module that the authentication is successful S906.

The agent manager module transmits meta data request signal regarding requested content to the content server S908. The meta data request signal includes client identification number and content identification number.

After receiving meta data request signal, the mesh control module of the content server searches meta data database and transmits the derived meta data to the agent manager module S910.

The agent manager module which received the meta data sends player open ready signal which represents that player open is ready S912.

Figure 10:
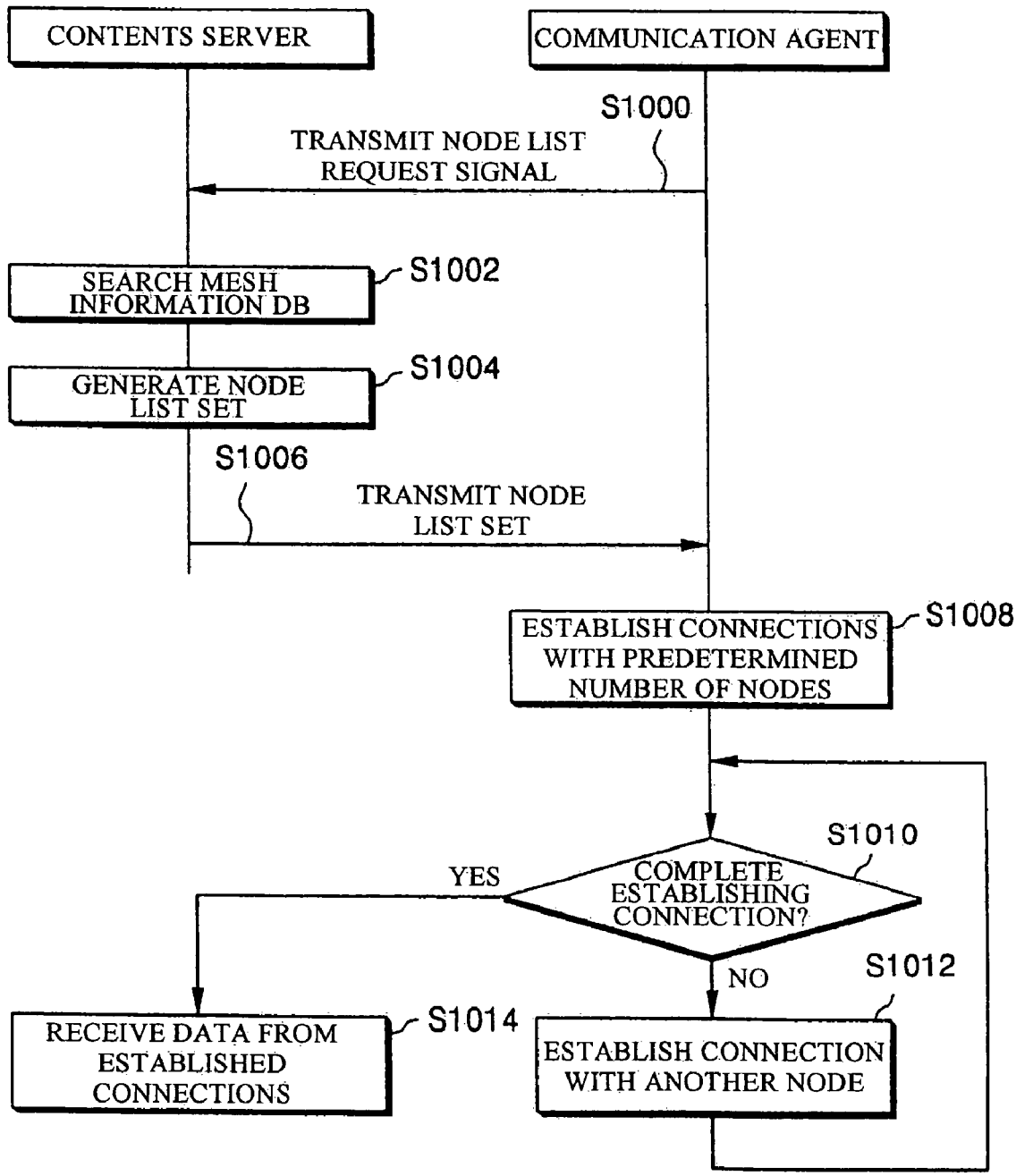
FIG. 10 is a flowchart for illustrating process for establishing connection after receiving node information from the content server according to one embodiment of the present invention.

FIG. 10 is a flowchart for illustrating process for establishing connection after receiving node information from the content server according to one embodiment of the present invention.

When the requested content data are not in cache of the user client, the communication agent transmits node list request signal to the content server S1000. The node list request signal includes identification number of the requested content and block number of block to be received.

The content server which received the node list request signal searches the mesh information database and derives node list which stores the requested block S1002.

The content server generates node list set using the derived node list S1004. The node list set includes content identification number, the number of node, IP address and port number of each node and node type.

The generated node list set is transmitted to the communication agent of the user client S1006.

The communication agent that received the node list set establishes connections with predetermined number of nodes among nodes included in the node list set S1008. As mentioned above, the connection control module performs connection establishment for each node.

The communication agent determines whether the connection is established for all of the predetermined number of nodes S1010, and receives sub block data included in requested block from nodes in parallel/distribution method S1014.

If connection is not established for all of the predetermined number of nodes, the new connection establishment is performed for node where connection establishment is not tried among nodes included in the node list S1012 and receives sub block data included in requested block in parallel/distribution method after completing connection establishment S1014.

Figure 11:
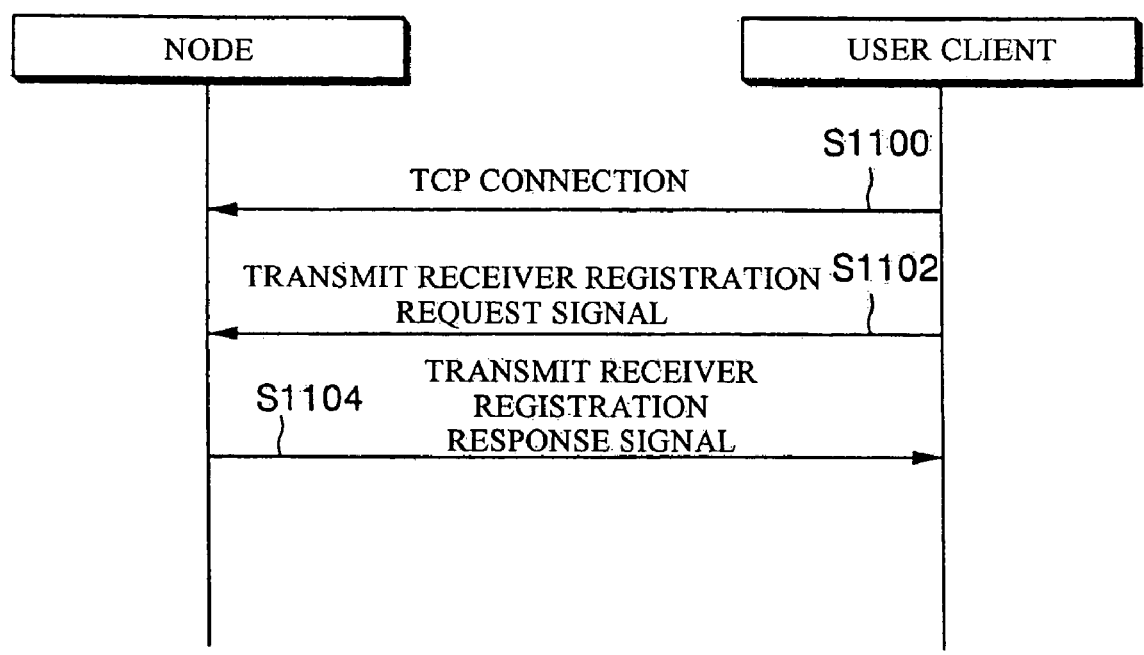
FIG. 11 is a flowchart of process that a user client that receives content establishes connection with a node.

FIG. 11 is a flowchart of process that a user client that receives content establishes connection with a node.

As shown in FIG. 11, the communication agent of the user client transmits receiver registration request signal S1102. The receiver registration request signal includes IP address and port number of the user client which requests connection and content information to request.

The node that received the receiver registration request signal determines whether the requested content is stored and connection establishment with the user client which requests content is possible (For example, the connection establishment is rejected when more than predetermined number of clients are in connection with the node).

If the requested content is stored and connection establishment is possible, the node completes receiver registration and transmits receiver registration signal to the user client S1104.

Figure 12A:
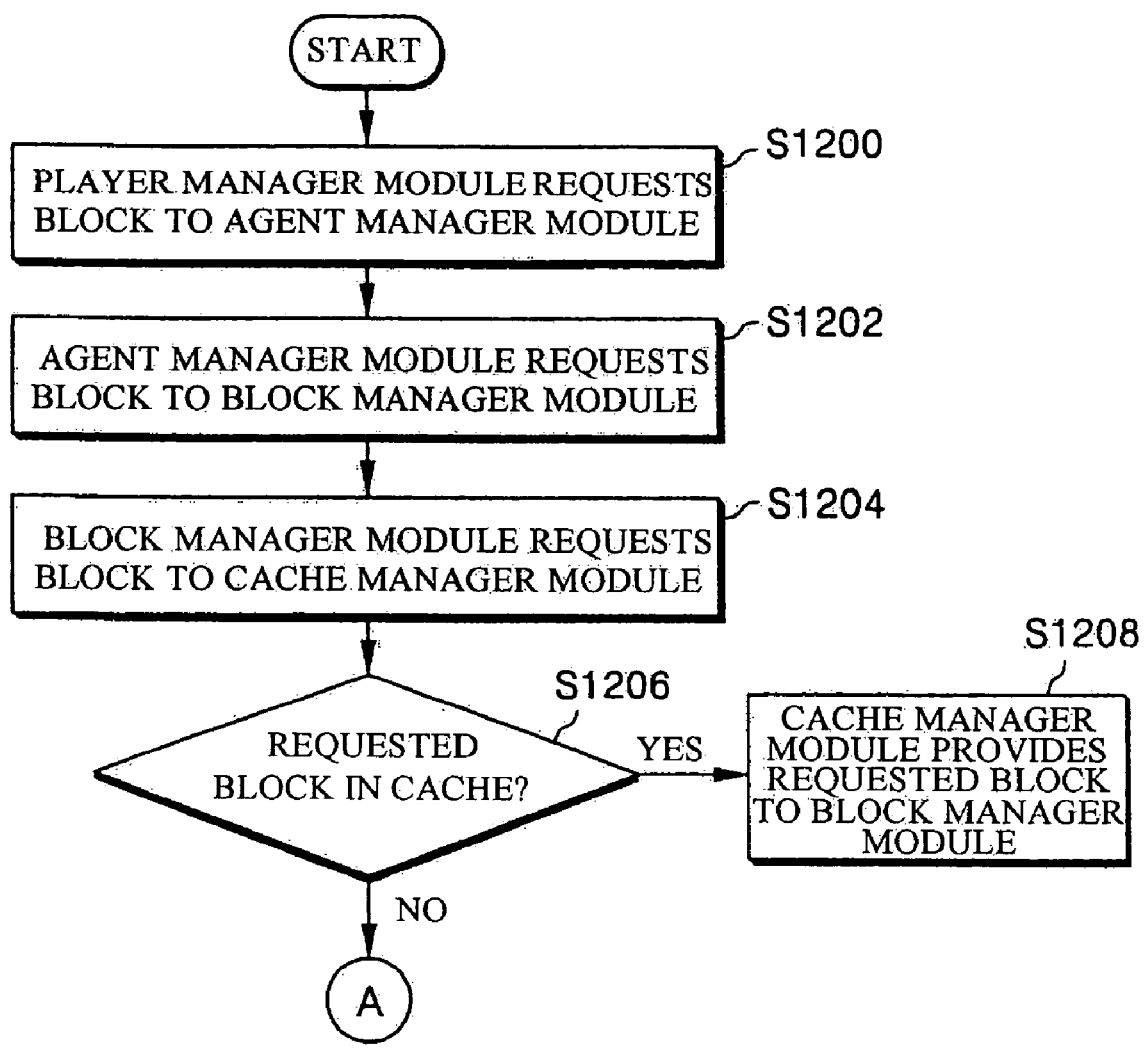
FIG. 12A and FIG. 12B is a flowchart of process that block data for playing content is provided to the player manager module.
Figure 12B:
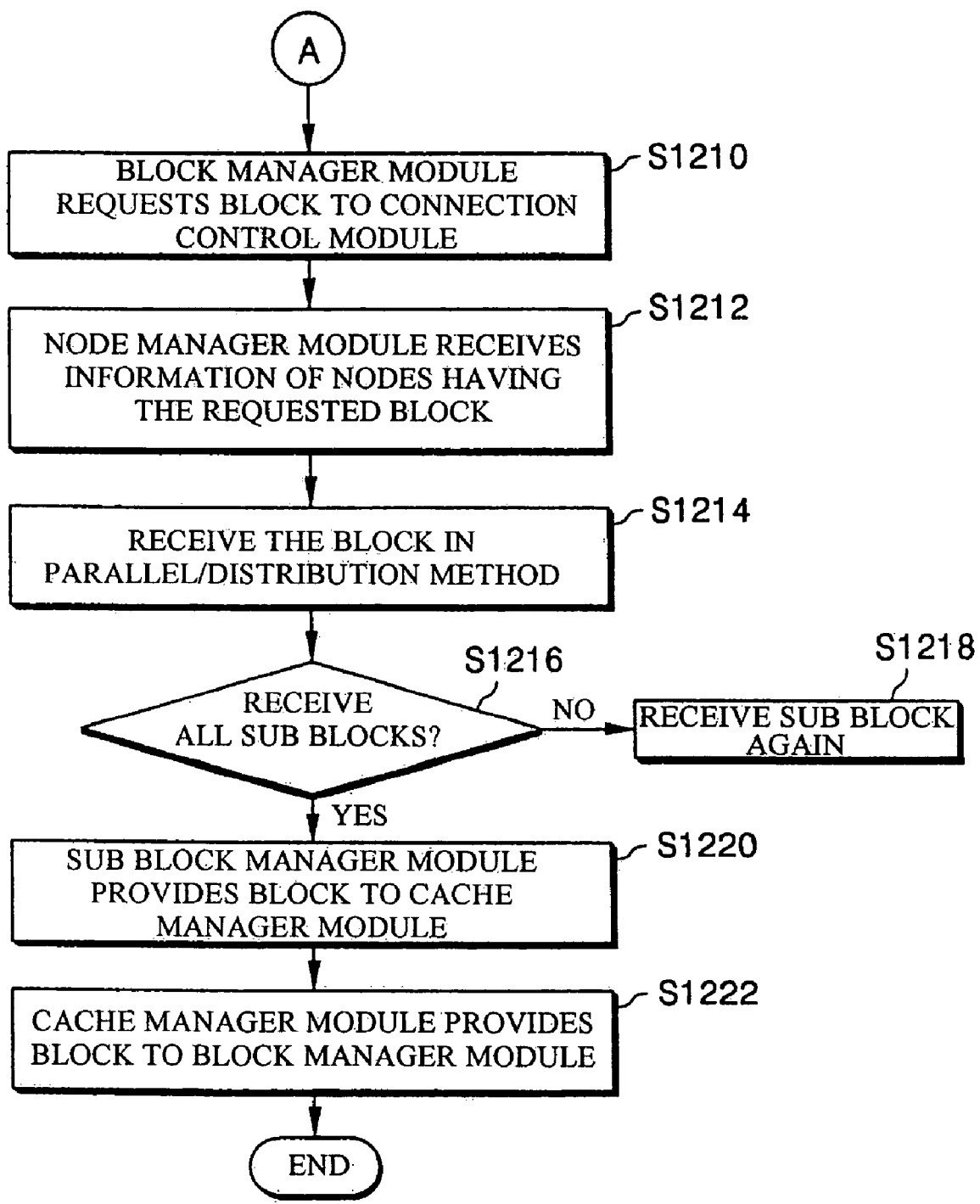

FIG. 12A and FIG. 12B is a flowchart of process that block data for playing content is provided to the player manager module.

The player manager module 406 requests block data for playing content to the agent manager module S1200. Block number information is included in the request signal.

The agent manager module that received block request signal from the player manager module requests the corresponding block to the block manager module S1202.

The block manager module 406 requests corresponding block to the cache manager module 402 S1204.

The cache manager module 402 determines whether requested block data are stored in cache S1206.

If the requested block data are stored in the cache, the cache manager module 402 provides corresponding block data to the block manager module S1208.

If the requested block data are not stored in the cache, the cache manager module 402 requests the connection control module 412 to receive corresponding block S1210.

The connection control module 12 receives information of nodes which store corresponding block through node manager module 414 S1212. The detailed process that node manager module receives node information is explained above.

The connection control module that received node information from the node manager module 414 establishes connection with predetermined number (N) of nodes and receives sub block data of corresponding block in parallel/distribution method S1214.

The sub block manager module 418 determines whether all sub blocks included in requested block are received from the plurality of nodes S1216.

If sub block receipt error occurs, the connection control module 412, as mentioned above, tries new connection establishment with a new node or receives the sub block with receipt error through other connection where sub block receipt is completed S1218.

If all sub blocks included in requested block are received, the sub block manager module 418 provides the received sub blocks to the cache manager module 402 and the cache manager module 402 stores the sub blocks in cache S1220. According to one embodiment of the present invention, the content data may be scrambled for security when stored.

The cache manager module provides block data of which all sub blocks are received to the block manager module S1222. In FIG. 12A and FIG. 12B, the sub block manager module 418 provides received sub blocks to the cache manager module, and the cache manager module 402 provides them to the block manager module 416. However, it would be apparent to those skilled in the art that sub block manager module can provide sub blocks to the block manager module directly unlike FIG. 12A and FIG. 12B. Further, function of each module can be changed by manager and it would be apparent to those skilled in the art that this kind of variation can be included in the scope of the present invention.

Figure 13:
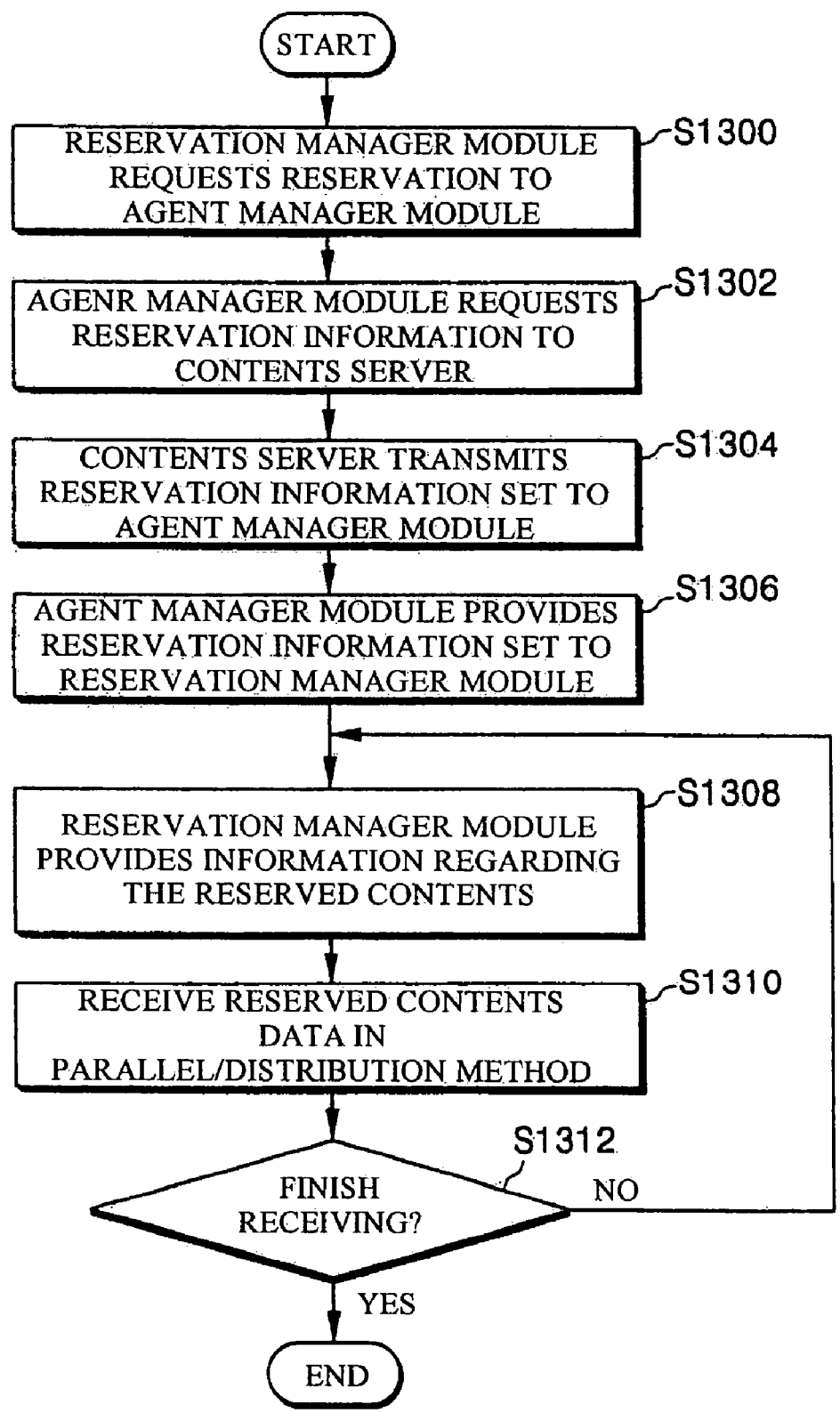
FIG. 13 is a flowchart of content reservation process according to one embodiment of the present invention.

FIG. 13 is a flowchart of content reservation process according to one embodiment of the present invention.

When a user requests reservation of content, the reservation manager module 408 provides reservation request information to the agent manager module 400 S1300.

The agent manager module 400 transmits reservation request signal to the content server S1302. The reservation request signal includes information of user client which requests reservation and content identification number for reservation.

The content server that received the reservation request signal transmits reservation information set to the agent manager module 400 of the user client S1304. The reservation information set may include content identification number, total number of blocks, necessary bandwidth and size of reservation link.

After receiving reservation information set, the agent manager module 400 provides the reservation information set to the reservation manager module S1306.

The reservation manager module 408 provides information regarding the reserved content to the player manager module S1308.

The player manager module 406, as described above, requests block data to the agent manager module and the connection control module receives sub blocks included in the requested block in parallel/distribution method after establishing connection with nodes having the requested block.

Content transmission process is continued automatically until all blocks of requested content is received, and received block data is stored in cache S1312.

As described above, according to one embodiment of the present invention, content can be transmitted effectively without high load of server although many user clients request content data.

Further, according to one embodiment of the present invention, the more users request content, the faster the content data can be transmitted.

Moreover, content data can be transmitted stably although connection with a node is disconnected, because content data are provided in parallel/distribution method.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of providing content in a system where a content server and a plurality of user clients are in data communication with each other via a network, the method comprising:
   (a) receiving, at the content server, information for content that each of the user clients stores, wherein each of the plurality of user clients stores a communication agent configured to communicate data with the content server and the respective communication agents of the other user clients, and wherein the communication agent of each user client is not shared by the other user clients;
   (b) receiving, at the content server, a content request signal from one of the plurality of user clients;
   (c) generating, at the content server, address information for nodes having the requested content, corresponding to the content request signal, based on the content information received in (a); and
   (d) providing the address information from the content server to the user client that has requested the content, wherein the node address information is configured to control the communication agent to establish connections between the user client and a plurality of nodes and to receive the requested content from at least one of the plurality of nodes by way of a parallel and distribution method,
   wherein the content data comprise a plurality of blocks which are divided from the content data by a predetermined size and each of the blocks comprises a plurality of sub blocks which are divided from the block by a predetermined size, wherein the plurality of blocks and the plurality of sub blocks are transmitted by the at least one node and received by the user client via a communication network, wherein the sub block data include header information including a resource identifier of the requested content, a block number and a sub block number, and wherein the resource identifier is indicative of the type of the requested content data.

2. The method of claim 1, further comprising providing information, for playing content including meta information, to the user client.

3. The method of claim 1, wherein the communication agent comprises:
an agent manager module configured to provide content information stored in the user client and a user client identification number and to transmit the content request signal to the content server when a user requests content;
a cache manager module configured to manage content information stored in the user client;
a mesh manager module configured to establish the connections with nodes having the requested content and to receive the content by way of the parallel and distribution method; and
a player manager module configured to provide the content request signal to the agent manager module and to provide the received content to a content player.

4. The method of claim 3, wherein the mesh manager module comprises:
a node manager module configured to receive, from the content server, address information for nodes having the requested content;
a connection control module configured to establish the connection with a predetermined number of nodes among nodes included in the node address information and to receive different sub blocks from at least one of the nodes;
a sub block manager module configured to determine whether all sub blocks included in a block are received; and
a block manager module configured to provide block data to the player manager module when all sub blocks included in a block are received.

5. The method of claim 4, wherein the connection control module comprises:
a module configured to determine whether a node where sub block transmission is completed, when a sub block data receipt error occurs in some nodes among nodes where the connection is established;
a module configured to request the sub block with the receipt error from the node where sub block transmission is completed; and
a module configured to establish a connection with new nodes using the node address information to receive sub block data with the receipt error when a node, in which a sub block receipt is completed, does not exist among nodes where the connection is established.

6. The method of claim 1, further comprising:
receiving content reservation request information from the user client; and
providing the user client with address information for nodes where the requested reservation content is stored.

7. The method of claim 2, wherein the providing information comprises:
receiving an authentication request signal from the user client;
transmitting a response signal for the authentication request to the user client;
receiving a meta data request signal from the user client; and
transmitting the requested meta data to the user client in response to the meta data request signal.

8. The method of claim 6, the communication agent further comprises a reservation manager module configured to transmit the reservation request information and to manage reserved content information.

9. The method of claim 1, wherein the communication agent controls the user client to:
transmit connection request information and content information stored in the user client;
transmit the content request signal to the content server;
receive address information for nodes having the requested content;
establish connections with a plurality of nodes based on the node address information; and
receive content from at least one of the plurality of nodes by way of the parallel and distribution method.

10. The method of claim 9, wherein the communication agent further controls the user client to store the received content in a cache memory of the user client.

11. The method of claim 1, wherein the communication agent controls the user client to:
identify a node where sub block transmission is completed when a sub block data receipt error occurs in some nodes among nodes where the connections are established;
request the sub block with the receipt error from the node where sub block transmission is completed;
establish connections with new nodes based on the node address information to receive sub block data with the receipt error when a node, in which a sub block receipt is completed, does not exist among nodes where the connections are established.

12. The method of claim 1, wherein at least one of the communication agents is downloaded from the server to at least one user client.

13. A server for providing content being in data communication with a plurality of user clients via a network, the server comprising:
a mesh control module configured to receive information for content stored in each of the plurality of user clients and to generate and provide node address information when one of the plurality of user clients requests content, wherein the node address information is indicative of which one of the plurality of user clients stores the requested content;
a content transmission module configured to transmit the requested content; and
a mesh information database configured to store the information for content which each of the plurality of user clients stores;
wherein each of the plurality of user clients stores a communication agent, and the node address information is configured to control the respective communication agent to establish connections between the respective user client and a plurality of nodes and to receive the requested content from at least one of the plurality of nodes by way of a parallel and distribution method, and wherein the communication agent of each user client is not shared by the other user clients and is configured to communicate data with the respective communication agents of the other user clients,
wherein the content data comprise a plurality of blocks which are divided from the content data by a predetermined size and each of the blocks comprises a plurality of sub blocks which are divided from the block by a predetermined size, wherein the at least one node is configured to transmit the plurality of blocks and the plurality of sub blocks, and the user client is configured to receive the transmitted plurality of blocks and sub blocks, via a communication network, wherein the sub block data include header information including a resource identifier of the requested content, a block number and a sub block number, and wherein the resource identifier is indicative of the type of the requested content data.

14. The server of claim 13, further comprising a meta information database configured to store meta information for playing the requested content.

15. The server of claim 13, the communication agent comprises:
an agent manager module configured to provide content information stored in the user client and a user client identification number and to transmit a content request signal to the server when a user requests content;
a cache manager module configured to manage content information stored in the user client;
a mesh manager module configured to establish the connections with nodes having the requested content and to receive the content by way of the parallel and distribution method; and
a player manager module configured to provide the content request signal to the agent manager module and to provide the received content to a content player.

16. The server of claim 13, wherein the communication agent further comprises:
a module configured to identify a node where sub block transmission is completed when a sub block data receipt error occurs in some nodes among nodes where the connections are established;
a module configured to request the sub block with the receipt error to the node where sub block transmission is completed; and
a module configured to establish the connections with new nodes using the node address information to receive sub block data with the receipt error when a node, in which a sub block receipt is completed, does not exist among nodes where the connections are established.

17. The server of claim 13, wherein at least one of the communication agents is downloaded from the server to at least one user client.

18. A user client system being in data communication with a content server and other client systems via a network, the user client system comprising a communication agent, wherein the communication agent comprises:
an agent manager module configured to i) provide, to the content server, information for content stored in the user client system and a user client identification number, ii) to transmit, to the content server, a content request signal when a user requests content and iii) to receive, from the content server, address information for nodes having the requested content;
a cache manager module configured to manage content information stored in the user client system;
a mesh manager module configured to establish connections with nodes having the requested content and to receive the content by way of a parallel and distribution method; and
a player manager module configured to provide the content request signal to the agent manager module and to provide the received content to a content player, wherein the content comprises a plurality of blocks which are divided from the content data by a predetermined size and each of the blocks comprises a plurality of sub blocks which are divided from the block by a predetermined size, wherein at least one of the other client systems is configured to transmit the plurality of blocks and sub blocks, and the user client is configured to receive the transmitted plurality of blocks and sub blocks, via a communication network, and wherein the mesh manager module comprises:
a sub block manager module configured to determine whether all sub blocks included in a block are received; and
a block manager module configured to provide block data to the player manager module when all sub blocks included in a block are received, wherein each of the other client systems comprises a communication agent, and wherein the communication agent of the user client system is not shared by the other client systems and is configured to communicate data with the respective communication agents of the other client systems, wherein the sub block data include header information including a resource identifier of the requested content, a block number and a sub block number, and wherein the resource identifier is indicative of the type of the requested content data.

19. The system of claim 18, wherein the mesh manager module further comprises:
a node manager module configured to receive address information for nodes having the requested content; and
a connection control module configured to establish the connections with a predetermined number of nodes among nodes based on the node address information and to receive different sub blocks from at least one of the nodes.

20. A method of providing Internet broadcasting service in a system where a content server and a plurality of user clients are in data communication with each other via a network, the method comprising:
receiving, at the content server, information for content that each of the user clients stores;
receiving, at the content server, a broadcasting request signal from one of the plurality of user clients, wherein each of the user clients stores a communication agent configured to communicate data with the content server and the respective communication agents of the other user clients, and wherein the communication agent of each user client is not shared by the other user clients;
generating, at the content server, address information for at least one node having broadcasting data corresponding to the broadcasting request signal, based on the received content information; and
providing the address information from the content server to the user client that has requested the broadcasting data, wherein the address information of the other user clients are configured to control the communication agent to establish connections between the user client and at least one of the other user clients having the broadcasting data and receive the broadcasting data from the at least one of the other user clients, wherein the content data comprise a plurality of blocks which are divided from the content data by a predetermined size and each of the blocks comprises a plurality of sub blocks which are divided from the block by a predetermined size, wherein at least one of the other client systems is configured to transmit the plurality of blocks and sub blocks, and the user client is configured to receive the transmitted plurality of blocks and sub blocks, via a communication network, wherein the sub block data include header information including a resource identifier of the requested content, a block number and a sub block number, and wherein the resource identifier is indicative of the type of the requested content data.

21. The method of claim 20, wherein the communication agent controls the user client to receive the broadcasting data by way of a parallel and distribution method.

22. A method of receiving content in a system where a content server and a plurality of user clients are in data communication with each other via a network, the method comprising:

providing, to the content server, information for content stored in the plurality of user clients;

transmitting a content request signal to the content server;

receiving, from the content server, address information for nodes where the requested content is stored;

establishing connections with a plurality of nodes based on the received node address information;

receiving the requested content form at least one of the plurality of nodes by way of a parallel and distribution method, wherein the content comprises a plurality of blocks which are divided from the content data by a predetermined size and each of the blocks comprises a plurality of sub blocks which are divided from the block by a predetermined size, and wherein the plurality of blocks and the plurality of sub blocks are transmitted by the at least one node and received by the user client via a communication network;

determining whether all sub blocks included in a block are received; and providing block data to the player manager module when all sub blocks included in a block are received, wherein each of the plurality of user clients stores a communication agent configured to communicate data with the content server and the respective communication agents of the other user clients, wherein the communication agent of each user client is not shared by the other user clients, wherein the sub block data include header information including a resource identifier of the requested content, a block number and a sub block number, and wherein the resource identifier is indicative of the type of the requested content data.

23. A method of providing content data in a communication network including a content server and a plurality of user clients, the method comprising:

receiving, at the content server, information for content that each of the user clients stores;

storing, at the content server, address information of user clients, which store certain content data that have been previously downloaded from the content server, wherein the content server and the plurality of user clients, being in data communication with each other, form a mesh network;

receiving, at the content server, a content request signal from one of the plurality of user clients (U1); and providing, at the content server, to the one user client (U1), the address information of at least one user client (U2), which stores the requested content data, based on the stored address information to the user client (U 1) that has requested the content data, so as to allow the user client (U1) to access the at least one user client (U2) based on the provided address information and download the content data from the at least one user client (U2), wherein each of the plurality of user clients comprises a communication agent, wherein the communication agent is configured to control the respective user client to establish a connection, based on the provided address information, with at least one of the remaining user clients which stores content data, and to receive the content data from the at least one remaining user client by way of a parallel and distribution method, wherein the communication agent of each user client is not shared by the other user clients and is configured to communicate data with the content server and the respective communication agents of the other user clients, wherein the content data comprise a plurality of blocks which are divided from the content data by a predetermined size and each of the blocks comprises a plurality of sub blocks which are divided from the block by a predetermined size, wherein at least one of the remaining user clients is configured to transmit the plurality of blocks and sub blocks, and the user client is configured to receive the transmitted plurality of blocks and sub blocks, via a communication network, wherein the sub block data include header information including a resource identifier of the requested content, a block number and a sub block number, and wherein the resource identifier is indicative of the type of the requested content data.

24. The method of claim 20, wherein at least one of the communication agents is downloaded from the server to at least one user client.

25. The method of claim 23, wherein at least one of the communication agents is downloaded from the server to at least one user client.

* * * * *